(12) United States Patent
Focht et al.

(10) Patent No.: US 10,304,194 B2
(45) Date of Patent: May 28, 2019

(54) METHOD FOR QUANTIFYING PRODUCE SHAPE

(71) Applicant: The Regents of the University of California, Oakland, CA (US)

(72) Inventors: Eric Focht, Riverside, CA (US); Mary Lu Arpaia, Riverside, CA (US); Rodrigo Alejandro Iturrieta Espinoza, Riverside, CA (US)

(73) Assignee: The Regents of the University of California, Oakland, CA (US)

( * ) Notice: Subject to any disclaimer, the term of this patent is extended or adjusted under 35 U.S.C. 154(b) by 245 days.

(21) Appl. No.: 15/468,375

(22) Filed: Mar. 24, 2017

(65) Prior Publication Data

US 2017/0278261 A1 Sep. 28, 2017

Related U.S. Application Data

(60) Provisional application No. 62/313,690, filed on Mar. 25, 2016.

(51) Int. Cl.
*G06T 7/12* (2017.01)
*G06T 7/62* (2017.01)
*G06T 7/136* (2017.01)
*G06T 7/194* (2017.01)

(52) U.S. Cl.
CPC ............... *G06T 7/12* (2017.01); *G06T 7/136* (2017.01); *G06T 7/194* (2017.01); *G06T 7/62* (2017.01); *G06T 2207/10024* (2013.01); *G06T 2207/20132* (2013.01); *G06T 2207/30128* (2013.01)

(58) Field of Classification Search
CPC ................................. G06T 7/12; G06T 17/20
See application file for complete search history.

(56) References Cited

U.S. PATENT DOCUMENTS

| 5,631,840 A * | 5/1997 | Ooka | G06T 17/20 700/182 |
| 2009/0010546 A1* | 1/2009 | Rossato | G06K 9/38 382/199 |
| 2013/0135492 A1* | 5/2013 | Ikeda | H04N 5/225 348/222.1 |

* cited by examiner

*Primary Examiner* — Tracy Y. Li
(74) *Attorney, Agent, or Firm* — Gavrilovich, Dodd & Lindsey LLP (57) ABSTRACT

The disclosure provides for an image processing method for quantifying produce shape. The disclosure further provides for the use of the image processing method for various applications, including digital produce sorting systems, and geographical information systems.

17 Claims, 8 Drawing Sheets

Upper / Lower ratio by IPGRI Shape

| Shape | Average | n |
|---|---|---|
|  IPGRI 7 | 2.407 a | 4 |
|  IPGRI 5 | 2.077 ab | 4 |
|  IPGRI 9 | 1.828 bc | 2 |
|  IPGRI 6 | 1.436 cd | 3 |
|  IPGRI 3 | 1.407 cd | 4 |
|  IPGRI 4 | 1.368 cd | 4 |
|  IPGRI 2 | 1.128 d | 4 |

Fig. 7

Height/ Width ratio by IPGRI Shape

| | Shape | Average | n |
|---|---|---|---|
|  | IPGRI 7 | 1.589 a | 4 |
|  | IPGRI 4 | 1.458 ab | 4 |
|  | IPGRI 9 | 1.450 ab | 2 |
|  | IPGRI 5 | 1.422 b | 3 |
|  | IPGRI 6 | 1.357 b | 3 |
|  | IPGRI 3 | 1.246 c | 4 |
|  | IPGRI 2 | 1.097 d | 4 |

FIG. 8

% of expected area, upper areas by IPGRI Shape

| | Shape | % expected area | n |
|---|---|---|---|
|  | IPGRI 7 | 61.39 a | 5 |
|  | IPGRI 9 | 60.05 ab | 3 |
|  | IPGRI 5 | 57.96 ab | 7 |
|  | IPGRI 6 | 54.49 bc | 10 |
|  | IPGRI 4 | 52.52 c | 7 |
|  | IPGRI 3 | 50.40 c | 5 |
|  | IPGRI 2 | 44.02 d | 4 |

METHOD FOR QUANTIFYING PRODUCE SHAPE

CROSS REFERENCE TO RELATED APPLICATIONS

This application claims priority under 35 U.S.C. § 119 to U.S. Provisional Application Ser. No. 62/313,690, filed on Mar. 25, 2016, the disclosures of which are incorporated herein by reference in entirety.

FIELD OF THE INVENTION

The disclosure provides for an image processing method for quantifying produce shape. The disclosure further provides for the use of the image processing method for various applications, including digital produce sorting systems for articles of manufacture and produce, and geographical information systems.

BACKGROUND

Since 1995, the Descriptors for Avocado (*Persea* spp.), published by the International Plant Genetic Resource Institute, has provided the descriptive method of choice for all aspects of avocado trait description. A graphic edition has been recently published (Barrientos-Priego et al., 2010). Both guides, however, are problematic in their categorization of fruit shapes as they are not presented on a linear scale and so cannot be easily quantified for identification by mathematical or machine methods.

SUMMARY

This disclosure provides for an image processing method for quantifying produce shape. The disclosure further provides for the use of the image processing method for various applications, including digital produce sorting systems, and geographical information systems.

In a particular embodiment, the disclosure provides a method of quantifying a produce shape, comprising: (1) capturing an image of produce using an image capture device and uploading the image to a computer that is connected or networked with the image capture device; (2) processing the image with photo editing software for data extraction, comprising: (a) removing noise on the border of the produce shape and surrounding background using cropping and/or thresholding; (b) reducing the image to binary of black and white using thresholding; (c) minimizing the image to be confined to the maximum length and width of the produce shape, wherein the image comprises a central produce shape and at least four quadrants of negative space surrounding the central produce shape; (3) quantifying the produce shape from the processed image, comprising: measuring the area of each quadrant, measuring the height of each quadrant, measuring the width of each quadrant, and measuring area of the central produce shape; and (4) outputting the quantified produce shape values. In a further embodiment, the produce is selected from group consisting of a fruit, a nut and a non-leafy vegetable. In yet a further embodiment, produce is an avocado. In another embodiment, the produce is illuminated with synthetic light from two or more light sources, wherein the light sources are placed to minimize shadows. In yet another embodiment, the light sources have a minimal light output of 800 lm to 1,600 lm. In a further embodiment, the light sources are located on opposite sides and an equal distance the produce. In yet a further embodiment, the light sources are at angle of 40° to 50° in relation to the produce. In another embodiment, the image capture device is located 20 cm to 80 cm from the produce. In a certain embodiment, the image capture device is a camera. In yet another embodiment, the photo editing software is a vector graphics editor, raster graphics editor, and/or a 3D modeler. In a further embodiment, wherein the photo editing software is capable of rendering images. In yet a further embodiment, the photo editing software has been programmed to automatically perform the processing of the image and quantifying the fruit shape from the captured produce image without waiting for a user to enter commands. In another embodiment, a method disclosed herein is fully automated.

In a particular embodiment, the disclosure also provides for a produce sorting and/or grading machine comprising a mechanical eye system that carries out a method disclosed herein, wherein the quantified shapes values are used to sort the produce.

In a certain embodiment, a method disclosed herein further comprises storing the geometric location of where the produce was acquired from, and outputting the quantified produce shape values as a shapefile for geographic information software (GIS). In a further embodiment, GIS software or GIS thematic map comprise a shapefile disclosed herein.

DETAILED DESCRIPTION

As used herein and in the appended claims, the singular forms "a," "an," and "the" include plural referents unless the context clearly dictates otherwise. Thus, for example, reference to "a produce shape" includes a plurality of such shapes and reference to "the descriptor" includes reference to one or more descriptors for produce known to those skilled in the art, and so forth.

Also, the use of "or" means "and/or" unless stated otherwise. Similarly, "comprise," "comprises," "comprising" "include," "includes," and "including," and "have," "haves," and "having," are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices and materials are described herein.

All publications mentioned throughout the disclosure are incorporated herein by reference in full for the purpose of describing and disclosing the methodologies, which are described in the publications, which might be used in connection with the description herein. Moreover, with respect to similar or identical terms found in the incorporated references and terms expressly defined in this disclosure, the term definitions provided in this disclosure will control in all respects.

The term "produce" as used herein generally refers to fruits, nuts, and vegetables whose shape can be quantified by the methods disclosed herein. In a particular embodiment, "produce" refers to fruits, nuts, and non-leafy vegetables.

While there have been recent attempts at updating the detail or scope of the descriptors for describing produce shapes, these new descriptors are not quantifiable. Accordingly, there is a need for developing techniques which can categorize produce shape using an objective system that can be statistically analyzed so as to provide a better descriptive system for the phenology of a crop. Using such as system, describable traits can be matched to quantitative traits and to molecular markers.

Figure 1:
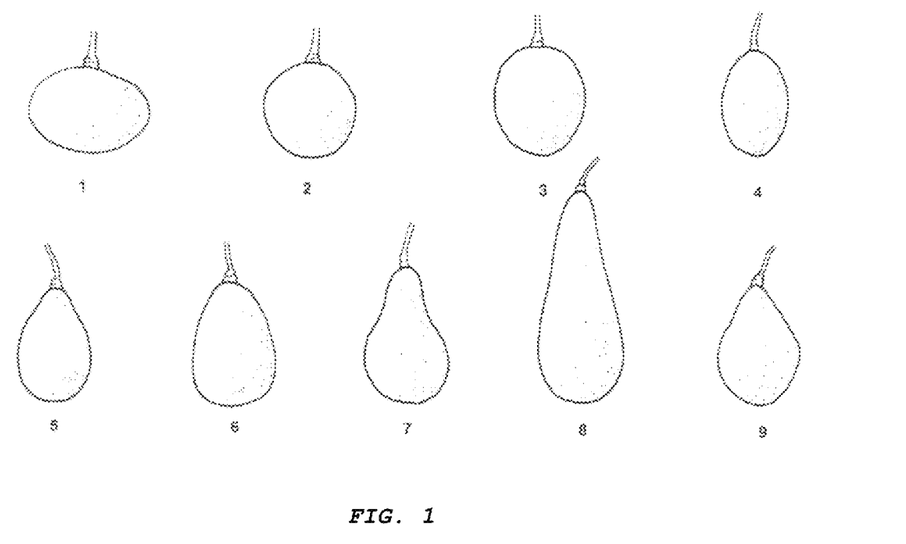
FIG. 1 provides the fruit shapes from the International Plant Genetic Resource Institute, Descriptors for Avocado Handbook. Fruit shapes are as follows: 1. Oblate; 2. Spheroid, 3. High Spheroid, 4. Ellipsoid, 5. Narrowly Obovate, 6. Obovate, 7. Pyriform, 8. Clavate, 9. Rhomboidal.

The disclosure provides an innovative method and system that allows for the quantification and categorization of object shapes. As is commonly recognized, the shape of an object defines its volume, weight and other qualitative characteristics. This is particularly true of produce. For example, FIG. 1 provides a number of different produce shapes. These produce shapes can exist in different produce (e.g., avocado vs. orange) or in the same produce (e.g., avocado species).

The method and system of the disclosure are inexpensive and utilizes a minimal series of measurements from photographs or images of produce. The method further provides for the creation of large databases/data libraries for mining of meaningful statistical patterns, and for sorting produce using these shape measurements. The method disclosed herein can be applied in a straight forward manner to quantify product shapes. With some slight modifications, the same methods disclosed herein can also be applied to other phenotypic traits associated with produce production which are more variable, such as whole tree canopy shape and inflorescence structure. In still other modifications, the system can be modified to screen various articles of manufacture.

Figure 2A:
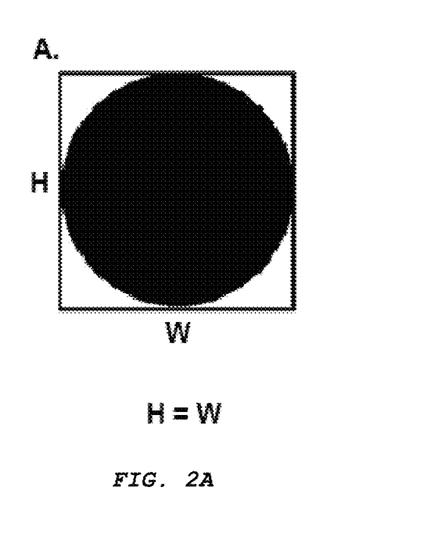
FIG. 2A-B provides a diagrammatic representation of (A) a produce in which the produce length (H) and produce diameter (W) are equal and (B) a produce in which the produce length (H) is greater than the produce diameter (W).
Figure 2B:
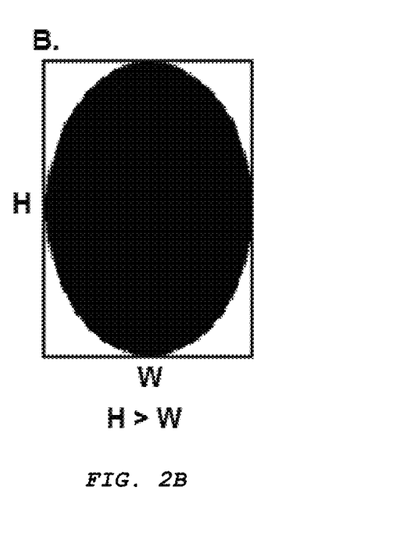
Figure 3A:
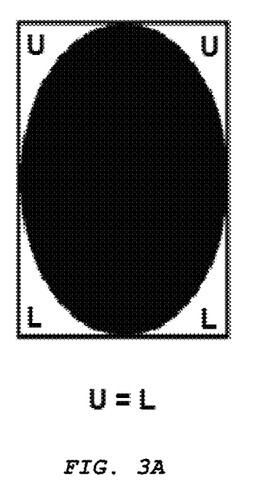
FIG. 3A-B provides a diagrammatic representation of (A) a produce where the white upper space (U) is equal to the white lower space (L) around the produce and (B) a produce where the white upper space (U) is greater than the white lower space (L) around the produce.
Figure 3B:
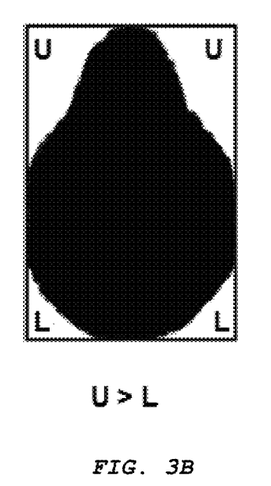
Figure 4A:
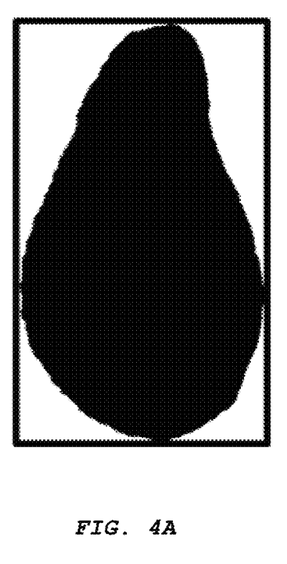
FIG. 4A-B demonstrates that in a typical digital photo of produce, (A) the photo comprises both positive space (the area taken up by the central produce shape) and negative space (the area surrounding the central produce shape); and (B) that if negative space is considered around the central fruit shape, the space is already split into quadrants, and the negative space is ready for analysis with no further manipulations.
Figure 4B:
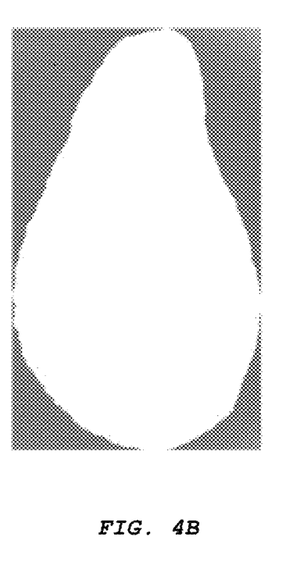
Figure 5:
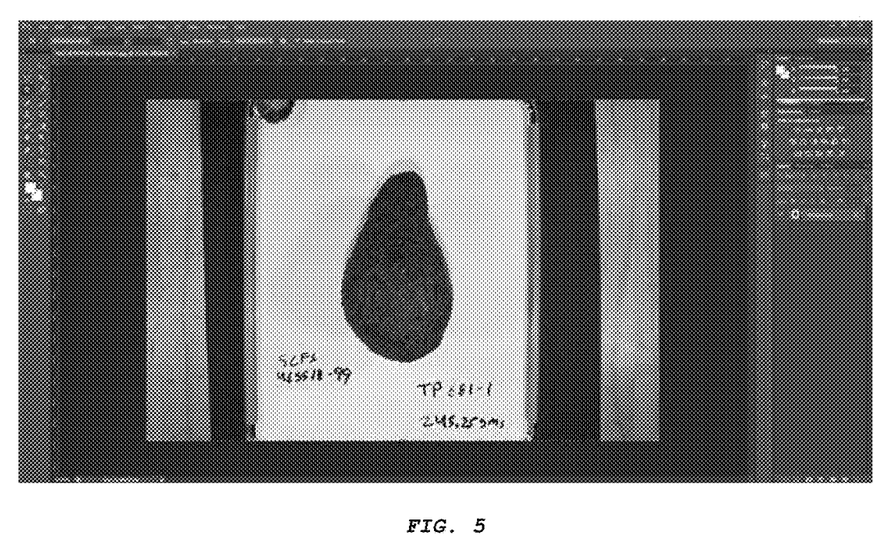
FIG. 5 presents a digital photo of an avocado that can be used in the methods disclosed herein.
Figure 6A:
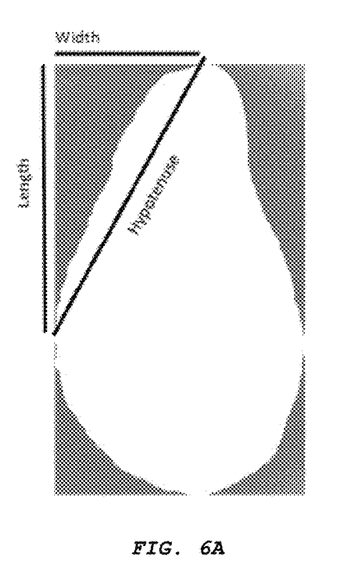
FIG. 6A-B demonstrates that (A) a rough approximation of the area of a quadrant of negative space can be determined by using simple geometric shapes, such as a right triangle; and (B) demonstrates how the negative space is split into four quadrants, with each quadrant having its own height and width dimensions.
Figure 6B:
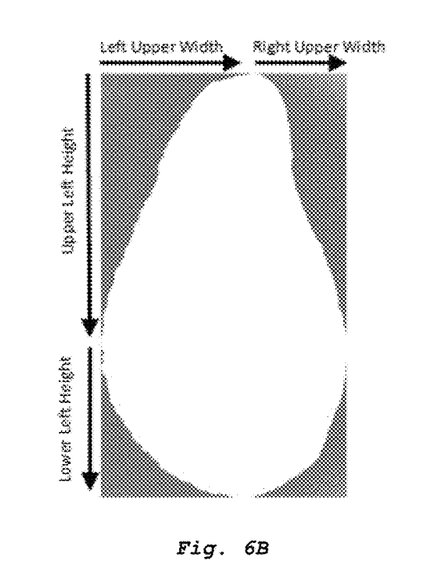
Figure 7:
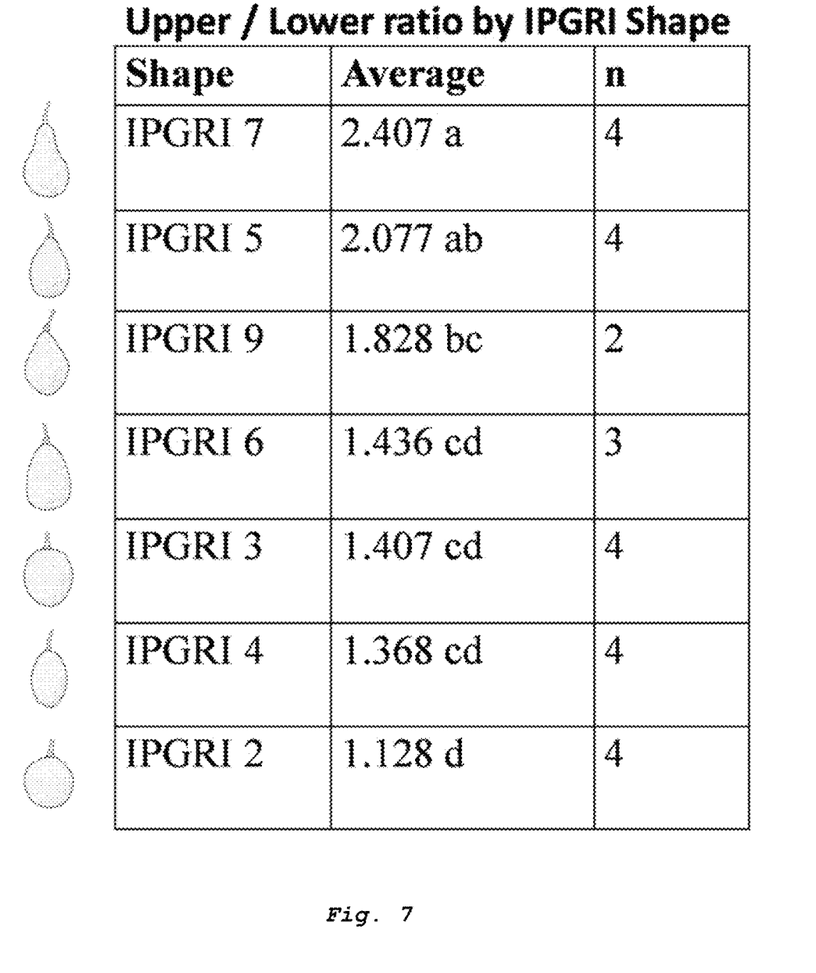
FIG. 7 presents a table showing how the quantified avocado shape values correlate with other avocado descriptors to determine avocado shape.
Figure 8:
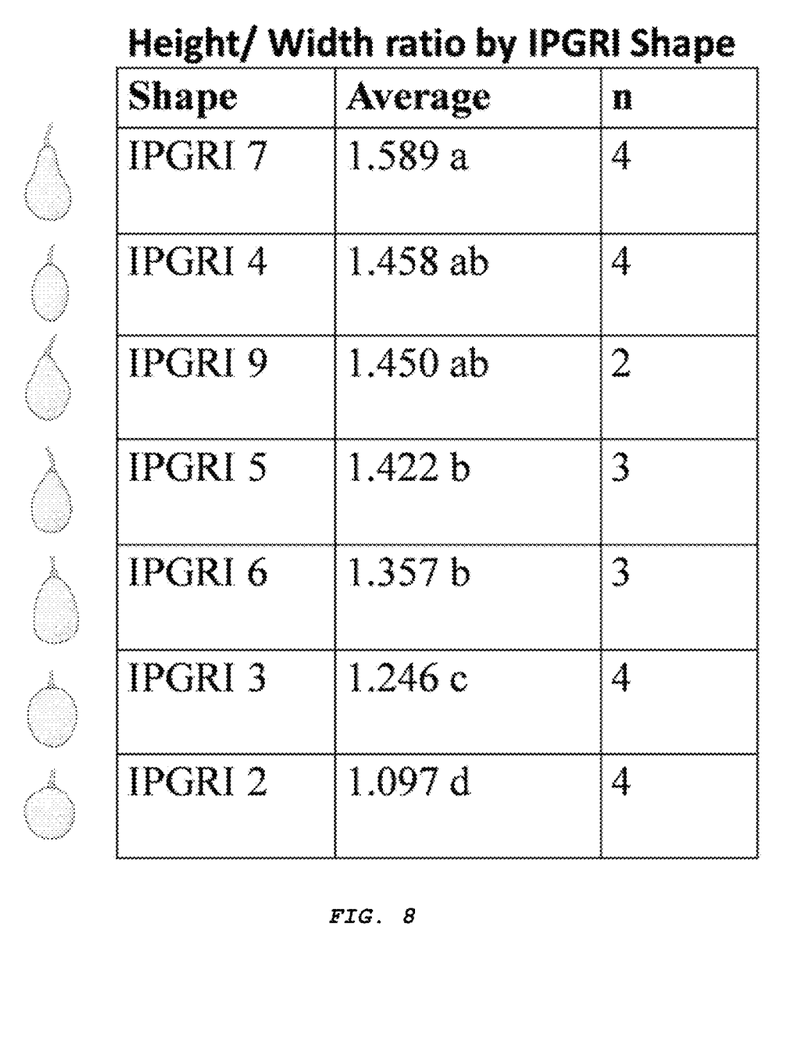
FIG. 8 presents a table showing how the quantified avocado shape values correlate with other avocado descriptors to determine avocado shape.
Figure 9:
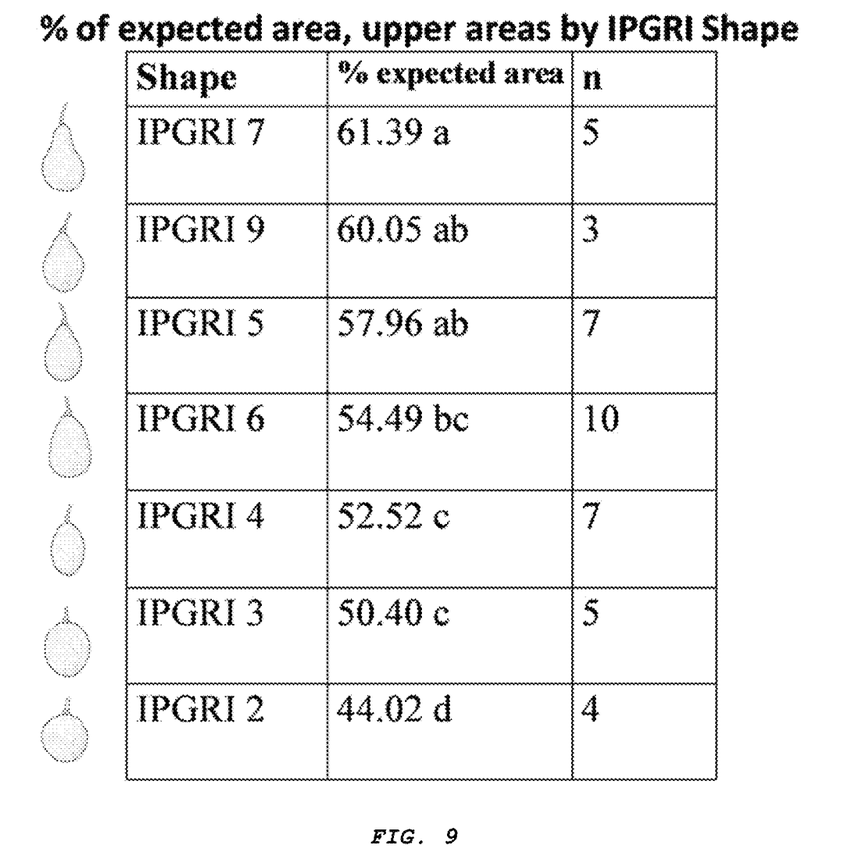
FIG. 9 presents a table showing how quantified avocado shape values correlate with other avocado descriptors to determine avocado shape.

The methods and devices of the disclosure use framing and negatives to identify shape and area. For example, FIGS. 2A-3B depict dimensioning, area and shape categorization. For example, as shown in FIG. 2A, a circular shaped object having a frame that is tangent at each edge of the object would provide a frame having a height and width that is equal. An object that is oblong (see, FIG. 2B, will have, e.g., a height that is longer than the width. Turning to FIGS. 3A and 3B these figures shows that a frame having tangents to each edge of the object provides for upper quadrants and lower quadrants. If, as shown in FIGS. 2A and 3A, the object is circular or oblong, then each upper and each lower quadrant will be of equal size. However, as shown in FIGS. 3B and 4A a non-symmetrical object will have quadrants of different size.

Figure 10:
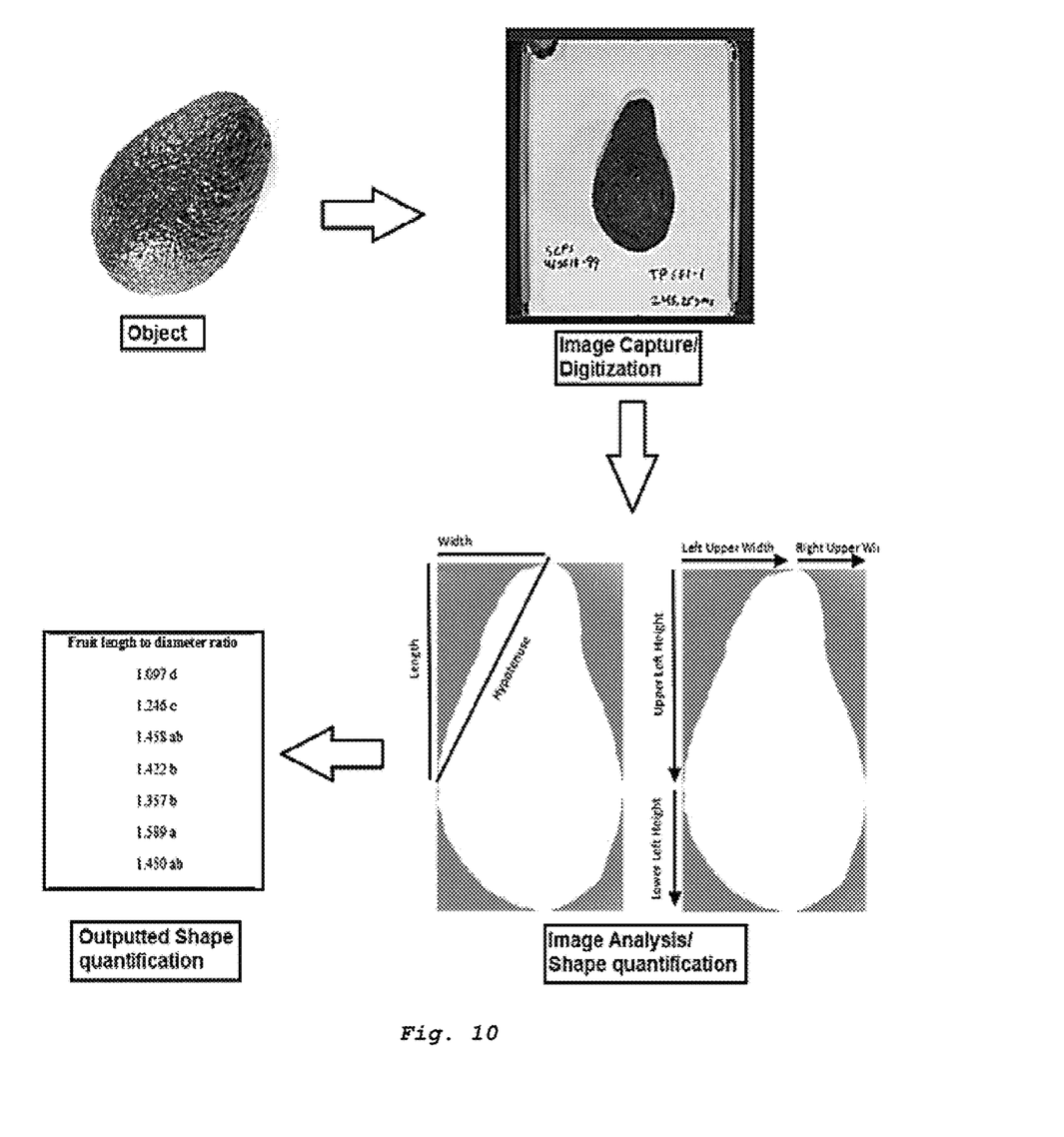
FIG. 10 presents an embodiment of the steps that can be used to quantify produce shape using the methods of the disclosure.

A method or system of the disclosure process images using a simple quantitation methods as depicted in FIG. 10. In this method an object (here an avocado) is imaged. The image is then processed to form a frame around the object. The image is then processed to define the length to diameter ratio, Upper to lower height ratio, upper to lower width ration etc. (see, FIGS. 6A, 6B and 7-9).

Figure 11A:
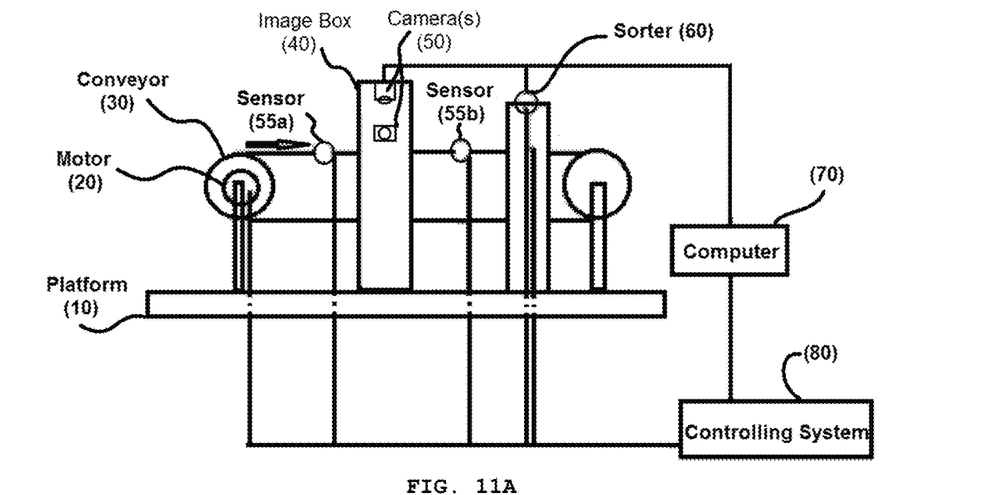
FIG. 11A-B provides a general schematic of an automated produce sorting system with an incorporated machine eye system. (A) provides a side view and (B) provides a top view.

Turning to FIG. 11A, there is depicted and exemplary sorting system (5). Sorting system (5) comprises a platform (10) to support a conveyor belt (30) and motor system (20). The platform (10) can be a floor or a table top. Also depicted is an image box (40), which contains/supports image capture devices (50) (e.g., such as a camera). Sensors (55a) and (55b) measure transport and objects (85) (see FIG. 11B) on conveyor (30). Following image capturing by image capture device(s) (50) and processing of the image by computer (70), the objects (85) can be sorted by mechanical sorter (60). Computer (70) is electrically and digitally connected (via wire or wireless communication to the image capture device(s) (50) and a controller system (80). The controller system (80) regulates and controls the transport of objects (85) on conveyor (30) through communication with the motor (20), sensors (55a,b) and sorter (60).

Figure 11B:
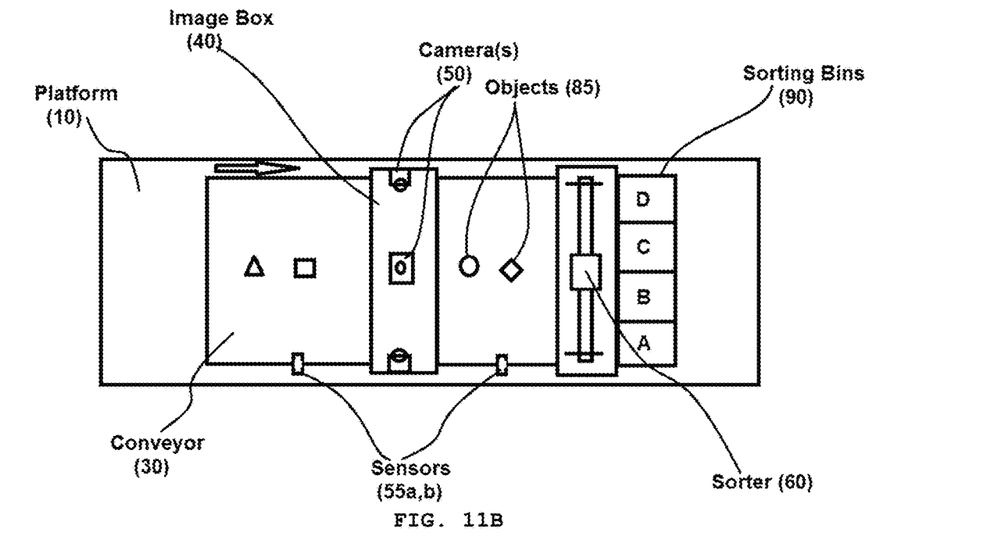

FIG. 11B shows a view of sorting system (5) from the top down. FIG. 11B depicts in further detail aspects of the sorter (60) which can separate objects based upon image analysis in to different sorting bins (90).

During operation objects (85) are transferred on conveyor (30). Controlling system (80) and computer (70) can calculate and control the speed of conveyor (30) by modulating the motor (20). Additionally, sensors (55a, b) can assist in calculating the distance between objects (85) and camera (50) in order to control the rate and timing of image acquisition. As an object (85) enter the image box (40) one or more images may be taken by image capture device(s) (50). In some embodiments, only a single image acquisition device (50) may be present. In such instances, the location of the image acquisition device (50) is typically overhead (i.e., above the object (85)), although in some instances in can be to either side or some other angle relative to perpendicular of the conveyor (30). In other embodiment, a plurality (e.g., 1, 2, 3, or 4) image acquisition devices (50) may be present. If more than one image capture device (50) is present, the location of image capture device(s) (50) may be at 1-90° from each other in the same plane (e.g., one immediately above and one 90° and facing across the conveyor (30).

Once an image of object (85) is capture it is communication to computer (70) to perform image analysis (as described elsewhere herein). Based upon the image analysis and the resulting "categorization" of the object (85), the conveyor (30) transports the object (85) to sorter (60). At sorter (60), the controller system (80) directs object (85) to the respective sorting bin (90) based upon the categorization by computer (70).

In a particular embodiment, a method and sorting system disclosed herein provides that the object (85) (e.g., a produce) is imaged using a fixed distance from an image capture device (50) to the object (85). In a further embodiment, the distance from the image capture device to the object is 10 cm, 15 cm, 20 cm, 21 cm, 22 cm, 23 cm, 24 cm, 25 cm, 26 cm, 27 cm, 28 cm, 29 cm, 30 cm, 31 cm, 32 cm, 33 cm, 34 cm, 35 cm, 36 cm, 37 cm, 38 cm, 39 cm, 40 cm, 45 cm, 50 cm, 55 cm, 60 cm, 70 cm, 80 cm, 90 cm, 100 cm, or a range between any two of the foregoing numbers, including fractional increments thereof, including but not limited to, increments of 0.05 cm, 0.1 cm, 0.25 cm, 0.5 cm, and 0.75 cm. In a particular embodiment, the distance from an image capture device to produce is about 28.25 cm.

Any number of various image capture device(s) (50) can be used. Examples, of image capture devices include, but are not limited to, digital or non-digital cameras, CCD devices and the like. In regards to the distance, an image capture device generally should be placed a distance from the produce so that the image capture device is able to capture the full positive space of the produce and some portion of the surrounding negative space. Typically, an image capture device is placed so that no zoom or minimal zoom is needed to capture said image of the produce.

In another embodiment, the object (e.g., produce) is orientated in a certain direction prior to an image capture device taking the image of the object (e.g., produce). For example, fruit may be orientated with the blossom end facing up towards the image capture device, the blossom end facing down and away from the image capture device, or the blossom end facing to the right or left of the range of field with the main longitudinal line of the produce being in a vertical plane along the image capture device's range of field.

In yet another embodiment, relevant information can be provided in the background or foreground of the object (e.g., produce) that can then be captured when the image of the object is taken. Care should be taken, however, to avoid overlapping the produce with the relevant information in the background, as it may make quantifying more difficult. Examples of relevant information, includes, but are not limited to, identifying characteristics of the produce, such as harvest date, cultivar name, geometric location of source trees or plants, weight of produce and other information which can be recorded and captured in the photo or image.

In a particular embodiment, natural or artificial lighting can be provided to illuminate the produce or product for image capture. Moreover, lighting can be provided from one or multiple directions. In regards to artificial lighting, any type of artificial lighting may be used, including, but not limited to, incandescent lighting, LED lighting, fluorescent lighting, halide lighting, and compact fluorescent lighting. In a further embodiment, the natural or artificial lighting can be provided so that illumination is from the right and/or left range of field at certain angle to the surface of the produce. Examples of such angles include, but are not limited to, 35°, 36°, 37°, 38°, 39°, 40°, 41°, 42°, 43°, 44°, 45°, 46°, 47°, 48°, 49°, 50°, 51°, 52°, 53°, 54°, 55°, 60°, 70°, 75°, 80°, 85°, 90°, or a range between any two of the foregoing angles, including fractional increments thereof, including but not limited to, increments of 0.05°, 0.1°, 0.25°, 0.5°, and 0.75°. In a further embodiment, the natural or artificial lighting should have a minimal light output of 200.0 lm, 300.0 lm, 450.0 lm, 600.0 lm, 800.0 lm, 900.0 lm, 1,000.0 lm, 1,100.0 lm, 1,300.0 lm, 1,400.0 lm, 1,500.0 lm, 1,600.0 lm, 2,400.0 lm, 3,100.0 lm, or a range between any two of the foregoing numbers. In yet a further embodiment, the light sources should be placed a certain distance from the centerline field of vision of the produce, such as 30 cm, 35 cm, 40 cm, 41 cm, 42 cm, 43 cm, 44 cm, 45 cm, 46 cm, 47 cm, 48 cm, 49 cm, 50 cm, 51 cm, 52 cm, 53 cm, 54 cm, 55 cm, 56 cm, 57 cm, 58 cm, 59 cm, 60 cm, 65 cm, 70 cm, 75 cm, 80 cm, 85 cm, 90 cm, 1000 cm, or a range between any two of the foregoing numbers, including fractional increments thereof, including but not limited to, increments of 0.05 cm, 0.1 cm, 0.25 cm, 0.5 cm, and 0.75 cm. Generally, any shadows created by illumination should be minimized. Moreover, it was found that the use of a flash was beneficial for reducing shadows for better produce shape capture. In regards to a camera, a preset focus or an autofocus may be utilized to adequately detailed focus for produce shape capture. Moreover, for digital cameras the image may be stored using typical image file formats, including but not limited to, .jpg, .tiff, .gif, .bmp, and .png. In a particular embodiment, digital camera images were saved in .jpg format. In a further embodiment, two of more photos or images may be taken of each produce. For example, a photo maybe taken each time the produce is rotated by 45°, 90°, and/or 135° on the vertical axis.

In a certain embodiment, a method of the disclosure can be implemented by using a computer system. For example, images of produce can be uploaded or transmitted to computer or database, wherein the computer or database may be locally or remotely connected to the image capture device. The computer system can comprise, for example, a locally connected computer, or a computer or a server coupled to various end user devices over a data communications network such as, for example, a public Internet. The server includes one or more software modules for creating and applying the methods of the disclosure.

The server can be coupled to a mass storage device such as, for example, a disk drive or drive array, for storing information used by the server for creating and applying the methods of the disclosure and for callback of stored "static" image data. For example, the mass storage device may store reference images, captured material data, generated 3D models, and any other information needed for creating and applying the lighting methods of the disclosure.

According to one embodiment of the disclosure, an end user devices may connect to the data communications network using a telephone connection, satellite connection, cable connection, radio frequency communication, or any wired or wireless data communication mechanism known in the art. The user(s) of the end user device(s) may connect to the server for downloading processed images. Once downloaded, the images may be displayed locally by one or more processors resident in the downloading end user device. The information stored in the server's mass storage device can also be stored locally in a data store coupled to the downloading end user device. According to another embodiment, computer readable and executable methods of the disclosure are provided in a computer readable media and delivered to a user of the end user device for installation.

In another embodiment, a method of the disclosure is implemented in a computer executable format for local renderings and processing. In this embodiment, a local computer will include the necessary processor and storage media for installation and execution of the computer readable file for processing images according to the methodology described herein.

In the computer implemented methods of the disclosure, the methods of the disclosure are implemented in a computer readable format and a computer readable medium such as, but not limited to, a flash-drive, optical drive, floppy or hard disk or a computer RAM/ROM.

In a further embodiment, for a method disclosed herein, photos or images stored on a computer system can be saved or re-saved with identifying data in the file name and organized in folders by date and/or batch. For example, in a research group the file name is organized to contain cultivar, site, date, picture number (as each produce may have 2 or more pictures taken with a certain degrees of rotation (e.g., 90°) along the vertical axis of the fruit), and produce number. The renaming of these files to contain this information can then be used for later processing and organizing data (e.g., for use in a spreadsheet in Microsoft Excel®). These files can be opened using an image rendering program (e.g., Adobe Photoshop®) and rendered, but the original files are retained for any miscellaneous data later needed or desired (such as fruit weight).

In a certain embodiment, the picture file may be edited using a rendering or photo editor program. For example, if the fruit shape border was encroached upon by material that would have given an extended or false shape to the border of the fruit shape image, it is carefully removed using a rendering or photo editing program (e.g., with Adobe Photoshop®'s editing tools while leaving the produce shape border intact. This is generally accomplished with the 'Zoom', 'Magic Wand' (at various tolerances) and 'Eraser' tools). Once the image is fully rendered it is ready for data extraction.

All rendered image files of a given group (usually grouped by produce origin, harvest date, cultivar) are opened using a program that can analyze images (e.g., Adobe Photoshop®). A custom selection of data points to export is useful to set as it limits the file size. It is useful to select as many data fields as possible for later analysis. Typical data fields that are determined and exported using the program include, but are not limited to, area, perimeter, circularity, height, width, and integrated density. In order to manage the exported data, Label, Date and Time, Document, and Source should be indicated.

In a further embodiment, the negative space around the produce shape are quantified, typically, quadrant by quadrant using a program that can analyze images (e.g., Photoshop®). Additional measurements may also be made of the images, including measuring the area of selection, measuring height of selection, measuring width of selection, integration density, gray value, circularity, perimeter etc. After recording the measurements of each quadrant, the area of the produce shape itself is selected and recorded. Once all of the data points for the entire image file are measured and recorded, the file is closed and the process is repeated on another file from the same group. Once all image files in a given group have been processed in a similar manner, the measurements are exported as a text or shapefile and named accordingly with relative time stamps, descriptors identifiers, and/or geographic coordinates. It should be noted for the above image editing and measuring steps above, as well as the exporting steps, these steps may be individually performed by a user entering commands, can be automated by employing a computer implemented algorithm, or some type of combination thereof.

In a particular embodiment, a geographic information system (GIS) comprises a method disclosed herein and/or the quantified shape data obtained by a method disclosed herein. A geographic information system (GIS) is a system for archiving, retrieving, and manipulating data that has been stored and indexed according to the geographic coordinates of its elements. In a general sense, GIS describes any information system that integrates, stores, edits, analyzes, shares, and displays geographic information. GIS applications are tools that allow users to create interactive queries (user-created searches), analyze spatial information, edit data in maps, and present the results of all these operations. GIS can relate unrelated information by using location as the key index variable. Locations or extents in the Earth space-time may be recorded as dates/times of occurrence, and x, y, and z coordinates representing, longitude, latitude, and elevation, respectively. All Earth-based spatial-temporal location and extent references should, ideally, be relatable to one another and ultimately to a "real" physical location or extent. One company involved in geographic information systems is ESRI, which maintains a website at www.gis.com that includes background information on conventional geographic information systems. Accordingly, for use with GIS, the text or shape file that is exported by the methods disclosed herein comprises spatio-temporal coordinates so as to allow for indexing with common GIS systems. For example, the data obtained by the methods disclosed herein can be entered into a GIS using computers or by using instruments that can carry out a method disclosed. By using a GIS system, the produce shape data obtained by using the methods disclosed herein can be incorporated into GIS thematic maps.

In an alternate embodiment, the disclosure further provides for a produce sorting machine which incorporates the methods disclosed herein. Handling (Post harvest) process of produce is completed in several steps: washing, sorting, grading, packing, transporting and storage. Produce sorting and grading are considered the most important steps of handling. Product quality and quality evaluation are important aspects of produce production. Sorting and grading are major processing tasks associated with the production of fresh-market produce. Considerable effort and time have been invested in the area of automation. Sorting is a separation based on a single measurable property of raw material units, while grading is "the assessment of the overall quality of a food using a number of attributes". Grading of fresh product may also be defined as 'sorting according to quality', as sorting usually upgrades the product. Sorting of agricultural products is accomplished based on appearance (color and absence defects), texture, shape and sizes.

In recent years, operations in grading systems for fruits and vegetables have become highly automated with mechatronics, and robotics technologies. Machine vision and image processing techniques have been found increasingly useful in the produce industry, especially for applications in quality inspection and defect sorting applications.

Computer application in agriculture and food industries have been applied in the areas of sorting, grading of fresh products, detection of defects such as cracks, dark spots and bruises on fresh fruits and seeds. Automated sorting and grading of produce is typically accomplished using cameras or sensors to take photos of produce, while image interpretation and decision making are done by appropriate software and hardware.

Machine vision technology uses a computer to analyze an image and to make decisions based on that analysis. There are two basic types of machine vision applications —inspection and control. In inspection applications, the machine vision optics and imaging system enable the processor to "see" objects precisely and thus make valid decisions about which parts pass and which parts must be scrapped. In control applications, sophisticated optics and software are used to direct the manufacturing process. Machine-vision guided assembly can eliminate any operator error that might result from doing difficult, tedious, or boring tasks; can allow process equipment to be utilized 24 hours a day; and can improve the overall level of quality.

The following process steps are common to the machine vision applications described herein:

Image acquisition. An optical system gathers an image, which is then converted to a digital format and placed into computer memory.

Image processing. A computer processor uses various algorithms to enhance elements of the image that are of specific importance to the process.

Feature extraction. The processor identifies and quantifies critical features in the image and sends the data to a control program.

Decision and control. The processor's control program makes decisions based upon the data.

Grading and sorting machine vision system comprise a feeding unit, a belt conveyor to convey the produce, a CCD camera located in an image acquisition chamber with lighting system for image capturing, control unit for open and close gates according to signals from computer unit and a computer with an image frame grabber to process the captured image. The acquisition of an image that is both focused and illuminated is one of the most important parts of any machine vision system. Image capture and digitizing the image are typically employ a video camera and a frame grabber, or charge-coupled device and CMOS chips. Pre-processing of an image can include thresholding, cropping, gradient analysis, and many more algorithms. All of the processes permanently change the pixel values inside an image so that it can be analyzed by a computer. The output from a machine vision system in the case of this disclosure is the sorting or grading of the produce by the quantified shape. Accordingly, the disclosure provides for use of the method disclosed herein in grading and sorting machine vision systems for produce.

Examples

Photographic Capture.

Avocado fruit are photographed at a fixed distance of 28.25 cm from the camera to surface on a stand using a Canon® SLR camera (Model DS126071) set at minimum zoom with a standard EFS 18-55 mm lens. The fruit was placed on a weighing boat for stability and positioned with either the blossom end facing up towards the lens or to the right of the range of field with the main longitudinal line of the fruit being in a vertical plane along the camera's range of field. The background on which the fruit was placed was a white markerboard upon which, identifying characteristics of the fruit, such as harvest date, cultivar name, location of source trees, weight of fruit and other information were recorded and captured in the raw digital photo. Care was taken to avoid overlapping the fruit with the wording written on the markerboard background, as this makes later image rendering more difficult. Lighting was provided from multiple directions from two 120 v×75-watt incandescent bulb reflector flood light bulbs each affixed in the right and left range of field at an angle of roughly 45 degrees to the surface and at a distance of 55 cm from the centerline of field of vision and 48 cm above the fruit surface. This lighting setup was used to minimize the shadow cast by the fruit. The flash was used since it was previously ascertained that this would provide even greater reduction of shadows for better fruit shape capture and in full automatic mode, the camera did not always activate the flash. The autofocus setting on the camera was enabled and was generally found to provide adequately detailed focus in capture. The images were saved in .jpg format.

Image Rendering.

The following steps were taken to render individual fruit images:

(1) Images were uploaded to a computer and saved with identifying data in the file name and organized in folders by date and batch. For the research group, the file name was organized to contain cultivar, site, date, picture number (as each fruit had 2 pictures taken with a 90-degree rotation along the vertical axis of the fruit as mentioned in the previous paragraph), and fruit number (generally fruit collected in batches of 5 fruit per selection, location, and date). The renaming of these files to contain this information was important for later processing and organizing data in Microsoft Excel®. These files were opened in Adobe Photoshop (CS6)® and rendered, but the original files were retained for any miscellaneous data later needed or desired (such as fruit weight).

(2) After opening a picture file (the Canon® SLR used in this procedure saved images in jpg format) in Adobe Photoshop (CS6)®, the fruit shape borders were evaluated for their cleanliness and freedom from any non-white or dark colored detritus or ink writing ("noise"). If the fruit shape border was encroached upon by material that would have given an extended or false shape to the border of the fruit shape image, it was carefully removed with Adobe Photoshop (CS6)®'s editing tools while leaving the fruit shape border intact. This was generally accomplished with the 'Zoom', 'Magic Wand' (at various tolerances) and 'Eraser' tools.

(3) Once any "noise" along the fruit shape border had been removed the 'Threshold' tool under 'Image>Adjustments' was used. This tool was selected and its default setting of '128' was used to render the fruit as black and the surrounding background as white. The value of 128 was usually sufficient to render the image but this value could be adjusted down or up to eliminate shadows or make the fruit shape border more or less regular and solid. Lower values were generally needed when shadows along the fruit edge were an issue.

(4) Once the picture is reduced to a binary of black and white using the 'Threshold' tool, the image was roughly cropped down to around the general area of the fruit shape. As it was more important to not cut off any of the fruit's edges or corners than to remove all black wording and detritus from around the fruit shape, the crop was generous in leaving space around the fruit.

(5) At this point, the 'Magic Wand' tool (tolerance at this point was not a big concern as there is a fairly clear binary distinction between the black of the fruit shape and the white of the background) was used to select the black fruit shape part of the image and this selection was then reversed so that the selection was of everything except for the fruit shape.

(6) The 'Eraser' tool was then selected with an extremely large brush (around 400 pixels) and the tool was dragged over the image with particular care to cover all the edges of the fruit shape as well as the frame in order to remove all non-fruit shape black pixels.

(7) The 'Eraser' tool selection was then deselected and the 'Crop' tool was again selected. At the top of the tool bar under 'Select>Color Range', color range was selected and when prompted, the 'Eyedropper' selection tool may be clicked on the fruit shape's black pixels in order to select the black pixels rather than the white pixels. The 'Crop' tool would then bring the edges of the image frame down to the edges of the fruit shape and by pressing "return" this selection and cropping are confirmed. The resulting image was confined to exactly the maximum length and width of the fruit shape.

(8) 'Magic Wand' was then selected, but this time the corner quadrants were clicked while holding down the "shift" key in order to allow all four quadrants to be selected simultaneously. Once all four quadrants were selected, the selection was inverted so that the area of the fruit shape and everything within the fruit shape borders were selected.

(9) The 'Pen' tool was then selected and a broad brush (400 pixels is ideal) with a solid fill was dragged over the entire fruit shape in order to fill in any white pixels that may have resulted from contours in the fruit's peel catching the light during the photographic capture period and which resulted in a white instead of black pixel during the Threshold Tool's (Step (4)). At this point the image was fully rendered and ready for data extraction.

Extraction of Data from Adobe Photoshop (CS6)® for Transfer into Microsoft Excel®.

The following steps were taken to extract the data from Adobe Photoshop (CS6)® and prepare for its transfer into Microsoft Excel®:

(1) All rendered image files of a given group (usually grouped by fruit origin, harvest date, cultivar), each picture file were opened in Adobe Photoshop (CS6)®. It was not necessary to work on the rendered images in order since the file names from the data source are kept in the .txt files generated (and opened in Microsoft Excel®). Along the right tool bar is an 'abacus' icon for the 'Measurement Log', this was selected to provide a visual reference that data recording was indeed occurring.

(2) At the top of the CS6 screen in the tool bar, the 'Analysis' tools are located under 'Image>analysis' and are important for this step. A custom selection of data points to export is useful to set as it limits the file size to what is important, moreover it prevented the final Microsoft Excel® file from being overly cluttered with unnecessary columns. It is useful to select as many data fields as possible for later analysis. In the studies presented herein the fields count, area, perimeter, circularity, height, width, and integrated density were selected and saved as a custom export. Additionally, in order to manage the exported data (which would come from many different files) all of the common 'Data Points' were left selected. Of particular importance were "Label, Date and Time, Document, and Source".

(3) After the 'Data Points' had been selected, the 'Magic Wand' tool was selected and used to click on and then select the upper left hand quadrant or corner of the image (white pixels) which represents the empty space around the fruit shape. Once this quadrant was selected, 'Image>Analysis>Record Measurements' was clicked and the data points for this measurement appear in the 'Measurement Log' window (a keyboard shortcut for this 'Record Measurements' command could be created; our lab's uses 'Shift+Control+M' at the work station most commonly used to handle image rendering and data extraction) This process of clicking on and selecting via the 'Magic Wand' tool was repeated in the upper right hand quadrant and these data points were also measured and recorded. This selection and recording measurements of quadrants continues through the lower right quadrant and lower left quadrant in a clockwise direction and afterwards, the area of the fruit shape itself (black pixels) was selected and recorded.

(4) Finally, 'Select>All' (Control+A is the keyboard shortcut) was selected and the measurements of data points for the entire .jpg image file were measured and recorded. Once all measurements were recorded from a given .jpg file, the file was closed and the process was repeated on another file from the same group.

(5) Once all image files in a given group have been processed in a similar manner, the 'Select All' (brackets around a ruler) icon in the 'Measurement Log' window was clicked on and then the 'Export Measurements" (ruler with an arrow overlaid upon it) was clicked on and a text file was generated and named according to lab data handling conventions. The 'Measurement Log' was cleared between groups ('Trashcan' icon in 'Measurement Log' window deletes all selected measurements) in order to keep group data separate and management simpler.

Processing Data in Microsoft Excel®.

The following steps are used to processed the data collected from Adobe Photoshop (CS6)®:

(1) The data in the 'Document' column was generated from the name of the image file from which data was collected in CS6. At the top of the Excel® screen in the tool bar, the 'Data' tab was located and under this tab, the 'Text to Columns' tool was important for this step and must be carefully used to parse these various identifiers. For this task, it is often important to use the 'Find and Replace' command to append specific strings of alphanumeric sequences with a unique signifying character. For example, the string "Hass" or "465518-99" would be replaced with "Hass&" and "465518-99&" assuming that "&" was not a character occurring otherwise in the data within the 'Document' column. "&" would then be used as a Delimiter in the 'Convert Text to Columns' Wizard to parse "Hass" and "465518-99" from whatever alphanumeric sequence followed them. Thus 2 columns were created that can be used to sort and organize the data by relevant criteria. Alternately, different varieties can have their 'Document' column 'Text to Column' converted by "Fixed Width" rather than "Delimited" converted. This was only an option when all 'Document' data begins w/the same variety name. This approach leads to handling all variety spreadsheets separately and then combining them later into a master spreadsheet for comparing across varieties.

(2) A further issue was that the 'Record Measurements' command in Adobe Photoshop (CS6)® often records several different sub-measurements of a selected area and these sub-measurements need to be discarded while the overall combined measurement that contained them needs to be retained. This was accomplished by selecting the rows that had a value of 1 or greater in the 'Count' column and discarding any measurements without a 'Count' value. This sort of Count was best performed prior to any parsing of 'Date and Time' and 'Document' since it removes redundant data rows and requires no special technical steps to complete.

(3) The Date and Time column from the rendered jpeg file was parsed using 'Text To Columns' in a similar manner to the 'Document' column. Additionally, any unimportant or useless alphanumeric text sequences were removed at this point. For example, a string of "−7:00" was appended to the data in the Date and Time column by Adobe Photoshop (CS6)® and this string was removed via 'Text To Columns' before Microsoft Excel® will recognize the remaining information as referring to time. This could make it more difficult sort the data by time sequence if left unchanged.

(4) Once the data rows were properly parsed and relevant columns for data were created, the data was sorted by time sequence and placed in chronological order. A new column was created named "selection" in which the proper designation of area selected was entered and these values were cut and pasted or propagated throughout the "selection" column in order to allow analysis by area of the image. With the sequence discussed earlier in the "Extraction of Data from Adobe Photoshop (CS6)® for transfer into Microsoft Excel®" section, the cut and pasted data would be Upper left, Upper right, Lower right, Lower left, Center, and Total in that specific order.

(5) For the specific purpose of avocado fruit shape analysis, two main areas of inquiry were focused on: (1) quadrant area and height/width differences between upper and lower halves of the image and (2) overall length:width ratio of the entire image. Pivot tables were generated in Microsoft Excel® to specifically focus on these areas of inquiry and are discussed in more detail below.

Results and Discussion.

The initial impetus for this methodology was to quantify fruit shape. It was believed that fruit shape could be examined in two ways: (a) a ratio of length (H) to diameter (W) to understand how evenly the fruit's mass was spread along a vertical plane (see FIG. 2), and (b) a ratio of positive to negative space across the entire image of the fruit to understand the evenness of mass distribution (see FIG. 3).

In particular, it was thought that a more "necky" fruit (lower portion of the fruit with a greater diameter than the upper portion), as typified by shapes IPGRI 7 and IPGRI 8, would show a very strong bias towards high empty space in the upper half of the image. Conversely, shapes IPGRI 2, IPGRI 3, and IPGRI 4 were expected to have a more balanced distribution of empty space across the upper and lower halves of the image, while shapes IPGRI 5 and IPGRI 9 were posited to be somewhere in between these extremes. Using the methodology described above, the analysis from fruit from several avocado selections showed the expected bias (see Table 1).

TABLE 1

Upper/Lower ratio by IPGRI Shape using the methodology described herein. IPGRI shape taken from fruit shape description in IPGRI, 1995 (Descriptors for Avocado (*Persea* spp.), International Plant Genetic Resources Institute, Rome, Italy. 52 p.).

| Shape | Fruit upper and lower ratio |
| --- | --- |
| IPGRI 2, spheroid | 1.128 d |
| IPGRI 3, high spheroid | 1.407 cd |
| IPGRI 4, ellipsoid | 1.368 cd |
| IPGRI 5, narrowly obovate | 2.077 ab |
| IPGRI 6, obovate | 1.436 cd |
| IPGRI 7, pyriform | 2.407 a |
| IPGRI 9, rhomboidal | 1.828 bc |

Data analyzed using CoStat V6.400 (CoHort Software, http://www.>> <<cohort.com). Mean separation using Student-Newman-Keuls at 95% of confidence.

As can be seen, IPGRI 7 (pyriform) and IPGRI 2 (spheroid) are on opposite ends of the Upper:Lower (U:L) spectrum, much as was expected. Moreover, even in this small sample size, the 2 extremes are able to be distinguished from the shapes that were previously felt to be subjectively "closest" to them in shape. In the case of IPGRI 2, this would be IPGRI 3 (high spheroid) and IPGRI 4 (ellipsoid), as both of these shapes appear to have more or less equal mass distributed on either side of the fruit's equator. For IPGRI 7, the shapes closest in appearance were thought to be IPGRI 5 (narrowly obovate) and IPGRI 9 (rhomboidal). The grouping of IPGRI 6 (obovate) with IPGRI 3 and IPGRI 4 was, however, unexpected as it was thought that IPGRI 6 was more "bottom heavy" than the analysis would indicate.

Table 2 continues to demonstrate that image analysis is useful in quantifying the extremes of the possible fruit shapes and marking them as discrete from the IPGRI shapes that fall in between them. Again, IPGRI 2 and IPGRI 7 are on opposite ends of a spectrum, but this time it is a spectrum of Length:Diameter ratio. As IPGRI 2 is essentially representative of a sphere, it should have the closest ratio to 1:1. IPGRI 3 is the closest to IPGRI 2, and this is again to be expected. Fortunately, the close grouping of IPGRI 3 and IPGRI 4 from the Length:Diameter analysis, is not present here and it may be possible to quantify the difference between these 2 shapes from the simple area analysis presented here. IPGRI 6 is again midpoint in the ratio analysis. Unlike the analysis in Table 1, IPGRI 6 is now closest to IPGRI 5. This is a more reasonable grouping than the results presented in Table 1 where IPGRI 6 was grouped with IPGRI 3 and IPGRI 4.

TABLE 2

Fruit length and diameter ratio by IPGRI Shape using the methodology described herein. IPGRI shape taken from fruit shape description in IPGRI, 1995 (Descriptors for Avocado (*Persea* spp.), International Plant Genetic Resources Institute, Rome, Italy. 52 p.).

| Shape | Fruit length to diameter ratio | n |
| --- | --- | --- |
| IPGRI 2, spheroid | 1.097 d | 4 |
| IPGRI 3, high spheroid | 1.246 c | 4 |
| IPGRI 4, ellipsoid | 1.458 ab | 4 |
| IPGRI 5, narrowly obovate | 1.422 b | 4 |
| IPGRI 6, obovate | 1.357 b | 3 |
| IPGRI 7, pyriform | 1.589 a | 4 |
| IPGRI 9, rhomboidal | 1.450 ab | 2 |

Data analyzed using CoStat V6.400 (CoHort Software, http://www.>> <<cohort.com). Mean separation using Student-Newman-Keuls at 95% of confidence.

A large data set from different growing regions and featuring multiple varieties/selections can be used to document the impact of growing environment on fruit shape. This quantification of fruit shape will also assist in understanding the physiology behind different fruit lengths and increased or decreased "neckiness" of fruit. Analyzing fruit throughout the growing season could also give a better understanding of key periods in fruit development that influences final fruit shape. It may also help growers better manage cultural practices that may influence shape fruit. Marketing analysts could also use this method to understand what consumer preference norms are for an acceptable or unacceptable fruit in a given market.

A number of embodiments of the invention have been described. Nevertheless, it will be understood that various modifications may be made without departing from the spirit and scope of the invention. Accordingly, other embodiments are within the scope of the following claims.

What is claimed is:

1. A method to quantify, categorize or sort an object, comprising:
   (A) capturing an image of the object using an image capture device;
   (B) transmitting the image to a computer that is connected or networked with the image capture device;
   (C) processing the image by:
      (i) removing noise on the border of the object shape and surrounding background;
      (ii) reducing the image to binary of black and white using thresholding;
      (iii) minimizing the image to be confined to the maximum length and width of the object shape, wherein the image comprises a central produce shape and at least four quadrants of negative space surrounding the central object shape defined by tangent lines that intersect at the apex of each edge of the object and which form a frame;
   (D) quantifying the object shape from the processed image, comprising:
      measuring the area of each of the at least four quadrants, measuring the height of each of the at least four quadrants, measuring the width of each of the at least four quadrant, and measuring area of the central object shape; and
   (E) outputting the quantified object shape values.

2. The method of claim 1, wherein the object is a produce.

3. The method of claim 2, wherein the produce is selected from group consisting of a fruit, a nut and a non-leafy vegetable.

4. The method of claim 3, wherein the produce is an avocado.

5. The method of claim 1, wherein the object is illuminated with synthetic light from two or more light sources, wherein the light sources are placed to minimize shadows.

6. The method of claim 5, wherein the light sources have a minimal light output of 800 lm to 1,600 lm.

7. The method of claim 5, wherein the light sources are located on opposite sides and an equal distance the object.

8. The method of claim 5, wherein the light sources are at angle of 400 to 500 in relation to the produce.

9. The method of claim 1, wherein the image capture device is located 20 cm to 80 cm from the produce.

10. The method of claim 1, wherein the image capture device comprises charged coupled device (CCD) or complementary metal oxide semiconductor (CMOS) sensors.

11. The method of claim 1, wherein the image capture device is a camera.

12. The method of claim 11, wherein the camera is selected from the group consisting of a camera phone, a digital camera, a digital camcorder, a personal portable terminal and a smart phone.

13. The method of claim 1, wherein the processing of the image is performed using a photo editing software.

14. The method of claim 13, wherein the photo editing software is a vector graphics editor, raster graphics editor, and/or a 3D modeler.

15. The method of claim 1, wherein the method further comprises storing a geometric location of where the object was acquired, and outputting the quantified object shape values as a shapefile for geographic information software (GIS).

16. The method of claim 1, implemented on an automated system.

17. A produce sorting and/or grading machine comprising a computer operably linked to image capture device and comprising instructions to carry out the method of claim 1, wherein the quantified shapes values are used to sort the produce.

* * * * *